US011858783B2

(12) United States Patent
Heen et al.

(10) Patent No.: US 11,858,783 B2
(45) Date of Patent: Jan. 2, 2024

(54) KNUCKLE BOOM CRANE, FOR OFFSHORE APPLICATION

(71) Applicant: REEL, Saint-Cyr-au-Mont-d'Or (FR)

(72) Inventors: Frank Heen, Blomsterdalen (NO); Bart Burger, Nieuw-Vennep (NL)

(73) Assignee: REEL, Saint-Cyr-au-Mont-d'Or (FR)

( * ) Notice: Subject to any disclaimer, the term of this patent is extended or adjusted under 35 U.S.C. 154(b) by 0 days.

(21) Appl. No.: 17/541,713

(22) Filed: Dec. 3, 2021

(65) Prior Publication Data

US 2022/0177279 A1 Jun. 9, 2022

(30) Foreign Application Priority Data

Dec. 3, 2020 (FR) ...................................... 2012580
Aug. 3, 2021 (FR) ...................................... 2108433

(51) Int. Cl.

*B66C 13/06* (2006.01)
*B66C 23/52* (2006.01)
*B66C 23/82* (2006.01)
*B66C 23/84* (2006.01)

(52) U.S. Cl.

CPC ............ *B66C 13/063* (2013.01); *B66C 23/52* (2013.01); *B66C 23/82* (2013.01); *B66C 23/84* (2013.01)

(58) Field of Classification Search

CPC ....... B66C 23/52; B66C 23/82; B66C 13/063; B66C 23/84

See application file for complete search history.

(56) References Cited

U.S. PATENT DOCUMENTS

| | | | | |
|---|---|---|---|---|
| 3,961,713 A * | 6/1976 | Stine | B66D 1/22 212/238 |
| 4,854,800 A | 8/1989 | Frick et al. | |
| 2010/0089855 A1* | 4/2010 | Kjolseth | B66C 13/02 212/276 |
| 2013/0220960 A1* | 8/2013 | Bjorshol | B63B 27/10 212/308 |
| 2020/0062554 A1* | 2/2020 | Borøy | B66C 23/54 |

FOREIGN PATENT DOCUMENTS

| | | |
|---|---|---|
| CN | 113135506 A | 7/2021 |
| NL | 2016444 | 9/2017 |
| WO | 2010077302 A1 | 7/2010 |
| WO | 2014/200354 | 12/2014 |
| WO | 2019/190314 | 10/2019 |

OTHER PUBLICATIONS

Search Report for FR2012580, dated Aug. 19, 2021, 2 pages.

* cited by examiner

*Primary Examiner* — Michael R Mansen
*Assistant Examiner* — Juan J Campos, Jr.
(74) *Attorney, Agent, or Firm* — NIXON & VANDERHYE

(57) ABSTRACT

Disclosed is a knuckle boom crane, for offshore application, the knuckle boom crane including a crane house, a knuckle boom carried by the crane house, a component for operating the crane house and the knuckle boom, and a controller for piloting the operating component. The controller include a active compensation module that is designed to pilot the operating means, taking into account data coming from a motion reference unit, in such a way as to stabilize a downstream end of the jib, advantageously in a horizontal plane and/or a vertical position, still preferably in all directions.

16 Claims, 6 Drawing Sheets

KNUCKLE BOOM CRANE, FOR OFFSHORE APPLICATION

CROSS-REFERENCE TO RELATED APPLICATIONS

This application claims priority benefit under 35 U.S.C. § 119(5 d) from French Patent Application No. 2012580, filed Dec. 3, 2020 and French Patent Application No. 2108433 filed Aug. 3, 2021, the disclosures of which are incorporated by reference herein in their entirety.

BACKGROUND OF THE INVENTION

Field of the Invention

The present invention relates to the technical field of marine cranes, and in particular that of knuckle boom cranes for offshore applications.

Description of the Related Art

In recent years, a new market has developed for wind farm Service Operation Vessels (SOVs).

Such vessels are used to transport tools and spare parts in order to intervene on offshore wind turbines that are installed off the coasts, on a platform attached to a foundation.

Now, deep-sea offshore operations are complicated by the vessel movements caused by the waves. Despite this environment, a controlled handling of the loads is essential for a safe working.

To remedy these constraints, the vessel has to be equipped with a crane having specific requirements.

Indeed, the accuracy of positioning of the load and of the crane boom end is crucial for avoiding collisions with the wind turbine platform.

This constraint involves compensating for the vessel movements in all directions at the level of the crane.

For that purpose, an approach has been to design a crane whose boom is modified with a jib mounted mobile in translation on a main boom.

Another approach has been to add a dedicated interface between the tool and the boom end.

These solutions of the prior art being not fully satisfying, there exists a need for a new solution providing compensation for the vessel movements in all directions.

SUMMARY OF THE INVENTION

In order to remedy the above-mentioned drawback of the state of the art, the present invention proposes a knuckle boom crane, for offshore application.

The knuckle boom crane comprises:

- a crane house,
- a knuckle boom, carried by said crane house,
- operating means for operating said crane house and said knuckle boom, and
- control means, for piloting said operating means.

The knuckle boom comprises a main boom and a jib, in series, said main boom and said jib each having an upstream end and a downstream end.

The crane house comprises knuckle means (or slewing mechanism) for defining a slewing motion of the knuckle boom about a slewing axis.

The crane house and the upstream end of the main boom cooperate through upstream knuckle means to define a swinging (or luffing) motion of said main boom about an upstream knuckle axis (luffing).

The downstream end of the main boom and the upstream end of the jib cooperate through downstream knuckle means to define a folding motion of said jib about a downstream knuckle axis (folding).

The operating means include:

- at least one slewing actuator, for generating the slewing motion of said knuckle boom,
- at least one first linear actuator (luffing cylinder), for generating said luffing motion of said main boom, and
- at least one second linear actuator (folding cylinder), for generating said folding motion of said jig.

And said control means include an active (3D) compensation means that is designed to pilot said operating means, taking into account data coming from a Motion Reference Unit (MRU), in such a way as to stabilize the downstream end of the jib, advantageously in a horizontal plane and/or a vertical position, still preferably in all directions.

The present invention hence provides stabilization of the downstream end of the jib by piloting, in combination, the slewing motion of the knuckle boom, the luffing motion of the main boom and the folding motion of the jib.

According to a particular embodiment, said at least one second linear actuator is connected to said crane house and to said jib.

In such an embodiment, the folding motion of the jib, implemented by said at least one second linear actuator that is connected to the crane house (instead of the main boom), requires a reduced power for the swinging motion of the main boom. This approach is interesting because the swinging (or luffing) motion of the main boom consumes most of the energy in compensation mode.

Other non-limitative and advantageous features of this embodiment according to the invention, taken individually or according to all the technically possible combinations, are the following:

- said at least one second linear actuator is connected to said jib through mechanical transmission means; preferably, said at least one second linear actuator has two ends, an upstream end assembled directly with the crane house, and a downstream end assembled with the jib through the mechanical transmission means;
- the mechanical transmission means comprise a deformable parallelogram structure that comprises at least one longitudinal arm, interposed between said at least one second linear actuator and said jib, advantageously extending opposite and along the main boom, and at least two swing arms, each interposed between said longitudinal arm and the main boom; preferably, the transmission means also include a connecting member, interposed between a downstream end of said at least one longitudinal arm and the upstream end of the jib, said connecting member extending said jib on the side of its upstream end, and said downstream end of said at least one longitudinal arm cooperating with said connecting member through knuckle means.

Other non-limitative and advantageous features of the product according to the invention, taken individually or according to all the technically possible combinations, are the following:

- said at least one first linear actuator (luffing cylinder) is arranged between the case house and the main boom; preferably, said at least one first linear actuator and said at least one second linear actuator are implanted on either side of the main boom, for example opposite a lower front wall and an upper front wall, respectively;

- said knuckle boom crane includes a winch drum associated with rotary drive means and intended to receive an elongated lifting member; preferably, said active compensation module is designed to also pilot said winch drum, taking into account data coming from said motion reference unit, in such a way as to pilot the winding motion of said winch drum;
- said at least one first linear actuator and/or said at least one second linear actuator consist of a hydraulic cylinder or an electric cylinder;
- the compensation module comprises means for collecting the data coming from the motion reference unit (MRU), processing means, for determining control instructions for the operating means, adapted to stabilize the downstream end of the jib, or even control instructions for the wind drum, and piloting means, for piloting said operating means, or even also said winch drum, taking into account said control instructions;
- said knuckle boom crane includes a motion reference unit (MRU).

Generally, according to a particular embodiment, the knuckle boom crane also includes a platform that is secured to the downstream end of the jib through connection means.

The connection means include a combination of at least two actuators:

- at least one first slewing actuator, intended to generate a slewing motion of said platform with respect to said downstream end, about a yaw rotation axis that is parallel to said slewing axis of the knuckle boom, and
- at least one second slewing actuator, intended to generate a slewing motion of said platform with respect to said downstream end, about a pitch rotation axis that is parallel to the upstream knuckle axis and to the downstream knuckle axis.

And the active compensation module is designed to pilot said at least two actuators of said connection means, taking into account data coming from a motion reference unit, in such a way as to actively stabilize said platform, advantageously in yaw and pitch.

Other non-limitative and advantageous features, linked to the platform, taken individually or according to all the technically possible combinations, are the following:

- the connection means include a link member integrating said at least two actuators, said link member having two ends: a first, upper end, secured to said downstream end of the jib and a second, lower end, secured to said platform; preferably, said first end includes said at least one second slewing actuator, and said second end includes said at least one first slewing actuator; still preferably, the link member is laterally secured to the downstream end of the jib, and said link member includes two sections: an upper section, rectilinear and parallel to the yaw rotation axis, in such a way that the pitch rotation axis passes through said downstream end of the jib, and a lower, curved section, in such a way that the yaw rotation axis passes through said downstream end of the jib;
- the connection means include damper means, advantageously passive, providing a translational degree of freedom of said platform with respect to the downstream end of the jib, along a translation axis parallel to the yaw rotation axis;
- the platform is in the form of a cab adapted to receive at least one individual;
- the platform includes at least one passive, shock absorber, adapted to absorb the contacts/shocks with the environment;
- the platform is equipped with means for manual piloting of said at least two actuators of the connection means;
- the downstream end of the jib and the connection means cooperate through removable connection means, integrating electrical and mechanical connection means.

The present invention also relates to a craft for offshore application, equipped with a knuckle boom crane according to the invention, for example a wind farm Service Operation Vessel (SOV).

The present invention also relates to the above-mentioned platform as such, with its connection means.

Of course, the different features, variants and embodiments of the invention can be associated with each other according to various combinations, insofar as they are not incompatible or exclusive with respect to each other.

BRIEF DESCRIPTION OF THE DRAWINGS

Moreover, various other features of the invention emerge from the appended description made with reference to the drawings that illustrate non-limitative embodiments of the invention, and wherein.

DESCRIPTION OF THE PREFERRED EMBODIMENTS

It is to be noted that, in these figures, the structural and/or functional elements common to the different variants can have the same references.

The knuckle boom crate 1 according to the invention, also called "crane", is suitable for offshore application.

Such a knuckle boom crate 1 is advantageously designed to be fitted on a craft for offshore application (not shown—also called "offshore craft").

This crane 1 is thus adapted to be taken on board the "offshore" craft, for example a service operation vessel.

The word "craft" includes in particular the marine crafts, notably the vessels, for example a wind farm service operation vessel or wind farm SOV.

This crane 1 can thus be used, without being limitative, for handling tools and spare parts in order to intervene on offshore wind turbines.

Figure 1:
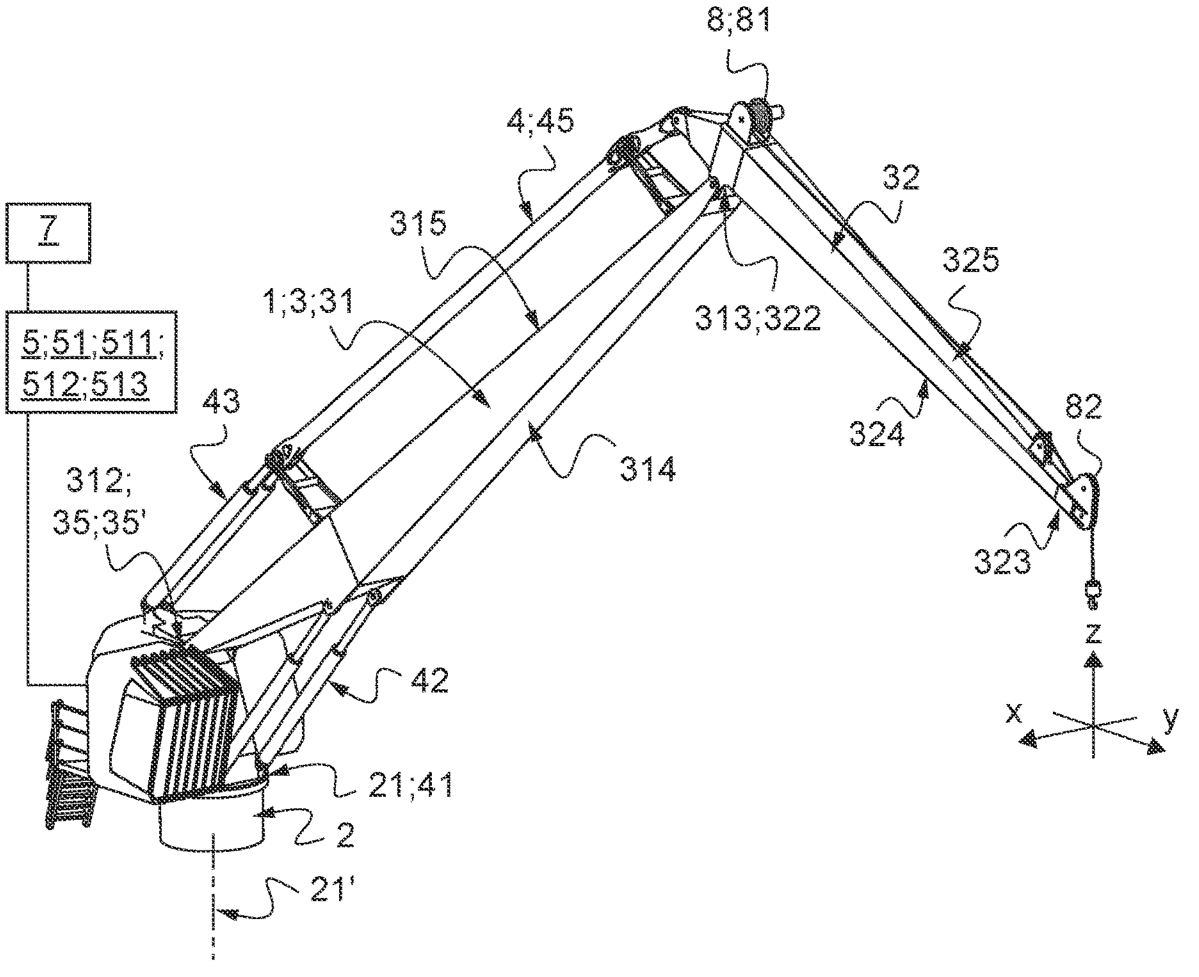
FIG. 1 is an overall and perspective view of a knuckle boom crane according to the invention.
Figure 2:
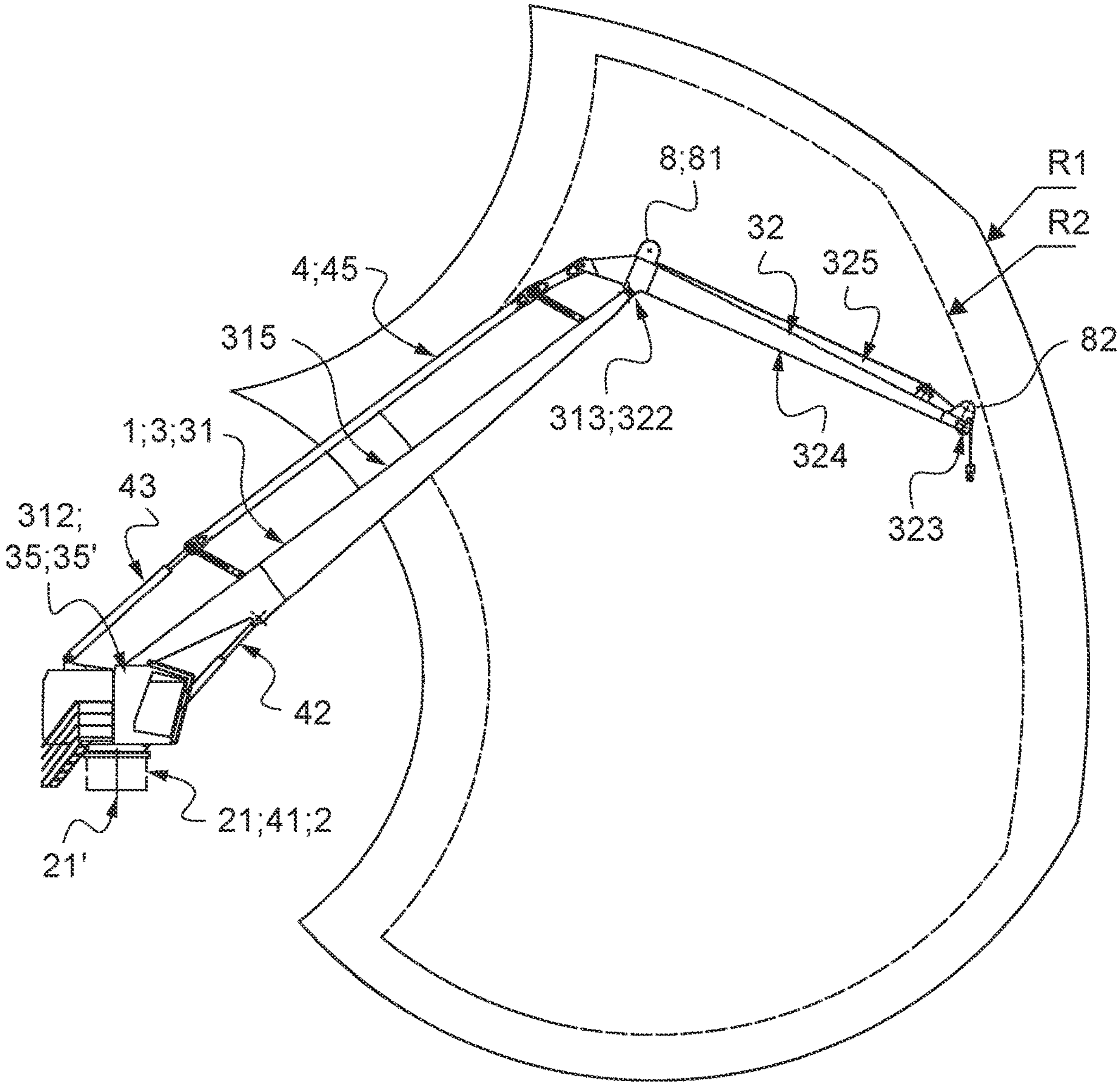
FIG. 2 is an overall and side view of a knuckle boom crane according to the invention.

As schematically illustrated in FIGS. 1 and 2, the knuckle boom crane 1 comprises:

- a crane house 2, forming the interface of the crane 1 with the craft,
- a knuckle boom 3, carried by the crane house 2, operating means 4, for operating the knuckle boom 3 and in particular its downstream end that will be described hereinafter, and control means 5, for piloting these operating means 4.

The crane house 2 advantageously consists of a barrel or a mast.

This crane house 2 comprises a knuckle means (or slewing mechanism) 21, for example a ball-bearing slewing ring, to define a slewing motion of the knuckle boom 3 about a slewing axis 21'.

This slewing axis 21' hence provides a rotational degree of freedom to the knuckle boom 3.

The knuckle boom 3 comprises two boom parts 31, 32 (also called arms or sections), assembled in series from the crane house 2:

an upstream, or proximal, main boom 31, and a downstream, or distal, jib 32.

The main boom 31 and the jib 32 each have:

an upstream end 312, 322, located on the crane house 2 side, and a downstream end 313, 323, located remote from the crane house 2.

The main boom 31 and the jib 32, here generally parallelepipedal in shape, also each have two opposite faces:

a lower face 314, 324, also called "lower front wall", intended to be directed downward/toward the ground, and an upper face 315, 325, also called "upper front wall", intended to be directed upward/toward the sky.

The crane house 2 and the upstream end 312 of the main boom 31 cooperate through upstream knuckle means 35 to define a swinging (or luffing) motion of said main boom 31 about an upstream knuckle axis 35', advantageously horizontal and perpendicular to the slewing axis 21'.

Thus, the main boom 31 is intended to be rotated with respect to the crane house 2, about this upstream knuckle axis 35' located at its upstream end 312.

The downstream end 313 of the main boom 31 and the upstream end 322 of the jib 32 cooperate through downstream knuckle means 36 to define a folding motion of said jib 32 about a downstream knuckle axis 36', advantageously horizontal and perpendicular to the slewing axis 21'.

Thus, the jib 32 is intended to be rotated with respect to the main boom 31, about the downstream knuckle axis 36' located at its upstream end 322.

The upstream knuckle means 35 and downstream knuckle means 36 advantageously consist of knuckles, for example in the form of rolling bearings, which are arranged between the assembled ends (for example, of the bearing/journal type).

The upstream knuckle axe 35' and downstream knuckle axe 36' extend parallel to each other, advantageously horizontally.

The downstream end 323 of the jib 32 is piloted in space by the operating means 4 that are piloted by the control means 5.

In particular, the downstream end 323 is mobile along the three axes (also called dimensions or directions), advantageously according to a position defined in a cartesian reference system, i.e. advantageously:

width (left/right), along the horizontal axis x (abscissa), depth (front/rear), along the horizontal axis y (ordinate), and height (top/bottom), along the vertical axis z.

For that purpose, the operating means 4 include:

at least one slewing actuator 41, for generating the slewing motion of said knuckle boom 3, at least one first linear actuator 42 (also called "luffing cylinder"), for example one linear actuator or two parallel linear actuators, for generating the swinging (or luffing) motion of the main boom 31 about its upstream knuckle axis 35', and at least one second linear actuator 43 (also called "folding cylinder"), for example one linear actuator or two parallel linear actuators, for generating the folding motion of the jib 32 about its downstream knuckle axis 36'.

As described hereinafter in relation with FIG. 3, said at least one first linear actuator 42 and said at least one second linear actuator 43 each have two ends:

an upstream end 421, 431, on the side of the crane house 2, and a downstream end 422, 432, opposite to the crane house 2.

The upstream ends 421, 431 and downstream ends 422, 432 are advantageously assembled within the crane 1 through upstream and downstream knuckle means that advantageously consist of knuckles, for example in the form of rolling bearings (for example, of the bearing/journal type).

Generally, said at least one slewing actuator 41 consists, for example, of a motor member integrated to the crane house 2.

And the linear actuators 42, 43 advantageously consist of hydraulic cylinders, preferably associated with a hydraulic power unit (not shown). The linear actuators 42, 43 can also consist of electric cylinders.

According to the invention, the control means 5 are designed to pilot the operating means 4 in such a way as to stabilize (in space, advantageously along the three axes) the downstream end 323 of the jib 32.

Preferably, the control means 5 are designed to stabilize the downstream end 323 of the jib 32 in a horizontal plane and/or a vertical position, or even in all directions.

By "horizontal plane", it is advantageously meant a stabilization in the plane defined by the width (x-axis or abscissa, horizontal) and the depth (y-axis or ordinate). By "vertical position", it is advantageously meant a stabilization in height (z-axis or height axis, vertical).

By "all directions", it is advantageously meant a stabilization in width (x-axis or abscissa, horizontal), depth (y-axis or ordinate) and height (z-axis or height axis, vertical).

For that purpose, the control means 5 include an active (3D) compensation module 51 that is designed to pilot the operating means 4, taking into account data coming from a motion reference unit (MRU) 7, in such a way as to stabilize the downstream end 323 of the jib 32, advantageously in a horizontal plane and/or vertical position, or even in all directions.

The active compensation module 51 is thus designed to pilot the operating means 4 in such a way as to compensate for the movements of the crane 1, and in particular of the downstream end 323 of the jib 32, caused by the waves.

Such an active compensation module 51 thus provides an accurate positioning of the downstream end 323 of the jib 32, making it possible to hold this downstream and 323 of the jib 32 at a constant position.

According to a preferred embodiment, the active compensation module 51 comprises:

collecting means 511 for collecting data coming from the motion reference unit 7, processing means 512, for determining control instructions for the operating means 4, adapted to stabilize the downstream end 323 of the jib 32, and piloting means 513, for piloting said operating means 4 taking into account said control instructions.

In practice, the control means 5 include a computer. And the active compensation module 51 comprises a computer program containing instructions that, when said computer program is executed by said computer, form the data collection means 511, the processing means 512 and the piloting means 513, when it is executed on said computer.

The active compensation module 51 thus advantageously forms a computer-controlled system that makes it possible to hold the position of the downstream end 323 of the jib 32 (compensating for the movements caused by the waves), using the operating means 4.

According to a particular embodiment, the operation can pilot the knuckle boom crane 1 via the control means 5, the movements caused by the waves being compensated for by the active compensation module 51.

The processing means 512 advantageously include a mathematical model or algorithm, which determines the control instructions for the operating means 4, adapted to stabilize the downstream end 323 of the jib 32 as a function of the data coming from the motion reference unit 7 (or, in other words, to compensate for the movements caused by the waves).

Hence, in practice, the operating means 4 are piloted by the active compensation module 51 according to the invention in such a way as to operate the downstream end 323 of the jib 32, advantageously along three axes, taking into account the information coming from the motion reference unit 7 in such a way as to stabilize (in space, advantageously along the three axes) this downstream end 323 of the jib 32.

For example, the downstream end 323 of the jib 32 is in particular operable along the following axes:

- width, by a coordinated piloting of the slewing actuator 41 in combination with the first linear actuator 42 and second linear actuator 43,
- depth, by a coordinated piloting of the first linear actuator 42 and second linear actuator 43, and
- height, by a coordinated piloting of the first linear actuator 42 and second linear actuator 43.

Generally, the motion reference unit 7 can be chosen among the motion reference units 7 known by the person skilled in the art.

Such a motion reference unit 7, advantageously conventional per se, is designed to record and evaluate the displacements of the craft due to the waves and, as a corollary, the displacements of the downstream end 323 of the jib 32.

This motion reference unit 7 consists for example of an inertial unit.

The knuckle boom crane 1 can include this motion reference unit 7; as an alternative, this motion reference unit 7 can be fitted on the craft.

In practice, as illustrated in FIG. 2, the knuckle boom 3 has two radii of action:

- a maximum radius of action R1, and
- a nominal maximum radius of action R2, in a compensation mode (here lower than the maximum radius of action R1).

Figure 3:
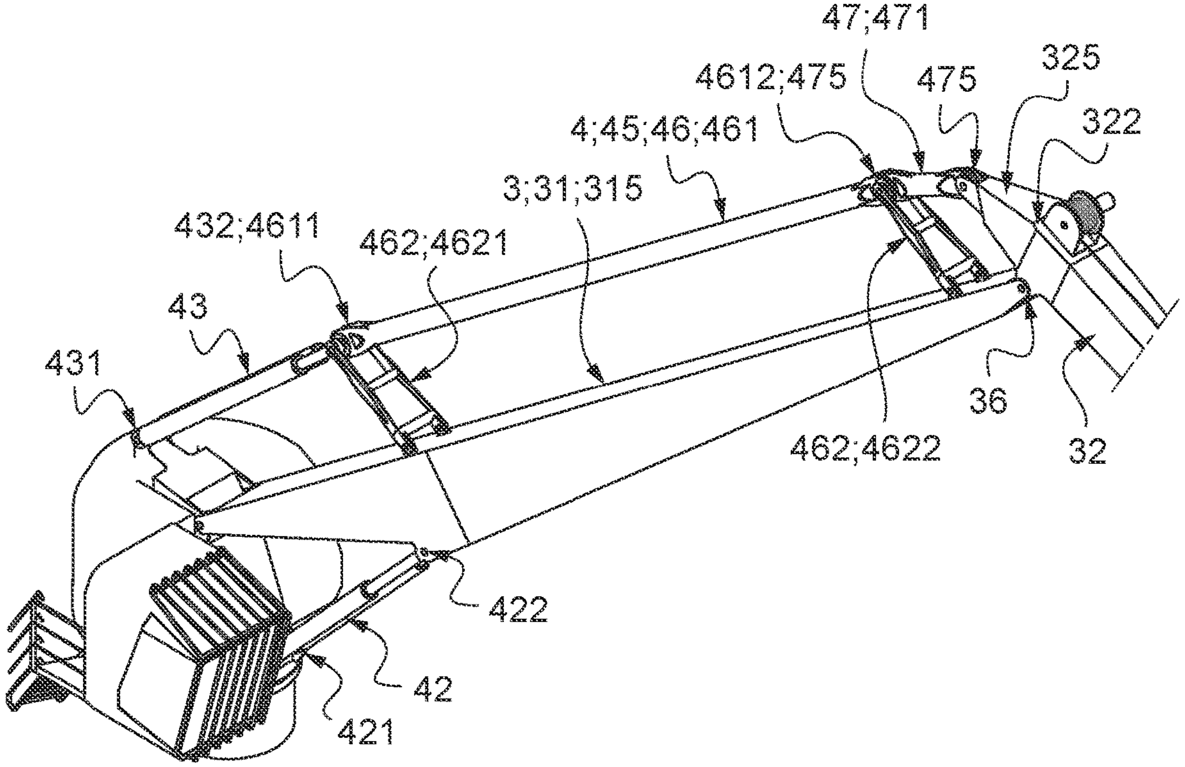
FIG. 3 is a partial and enlarged view of the knuckle boom crane, showing the main boom in more detail.

The knuckle boom 3, illustrated in FIGS. 1 to 3, is particularly adapted to be fitted on a knuckle boom crane 1 whose control means 5 include such an active compensation module 51.

Generally, such a knuckle boom 3 according to the invention is intrinsically interesting, potentially to be fitted on a knuckle boom crane 1 whose control means 5 are devoid of such an active compensation module 51 or when the compensation mode 51 is deactivated.

Indeed, said at least one second linear actuator 43 has here a particular implantation in that it is here connected to the crane house 2 and to the jib 32.

Now, as mentioned hereinabove, the folding motion of the jib 32, implemented by said at least one second linear actuator 43 that is connected to the crane house 2, requires a reduced power for the swinging motion of the main boom 31. This approach is interesting because the swinging (or luffing) motion of the main boom 31 consumes most of the energy in compensation mode.

For that purpose, said at least one second linear actuator 43 is advantageously connected to the jib 32 through mechanical transmission means 45 (see in particular FIG. 3).

Within this framework, as described hereinafter in connection with FIG. 3, said at least one second linear actuator 43 advantageously has two ends:

- the upstream end 431 assembled directly with the crane house 12, and
- the downstream end 432 assembled with the jib 32 through mechanical transmission means 45.

Within this framework, said at least one second linear actuator 43 is operable lengthwise with, advantageously:

- an elongation that causes a folding of the jib 32 towards the main boom 31, and
- a shortening that causes a extension of the jib 32 with respect to the main boom 31.

Here, the mechanical transmission means 45 comprise a deformable parallelogram structure 46 that comprises:

- at least one longitudinal arm 461, interposed between said at least one second linear actuator 43 and the jib 32, and
- at least two swing arms 462, each interposed between the longitudinal arm 461 and the main boom 31.

In FIG. 3, said at least one longitudinal arm 461 advantageously extends opposite and along the main boom 31, in particular the upper front wall 315 thereof.

Said at least one longitudinal arm 461 also has two ends:

- an upstream end 4611 assembled with the downstream end 432 of said at least one second linear actuator 43, here by a pivot link, and
- a downstream end 4612 assembled with the upstream end 322 of the jib 32, here by a pivot link.

Said at least two swing arms 462 (here, ladder- or H-shaped) are assembled with the longitudinal arm 461 and the main boom 31, in such a way as to be mobile in rotation (free in rotation).

In particular, the swing arms 462 are here assembled with the upper front wall 315 of the main boom 31.

An upstream swing arm 4621 is assembled:

- on a first side, with the main boom 31 (towards its upstream end 312), and
- on a second side, with the couple composed of the upstream end 4611 of said at least one longitudinal arm 461 and the downstream end 432 of said at least one second linear actuator 43.

A downstream swing arm 4622 is assembled:

- on a first side, with the main boom 31 (towards its downstream end 313), and
- on a second side, with the couple composed of the downstream end 4612 of said at least one longitudinal arm 461 and the upstream end 322 of the jib 32.

According to the present embodiment, illustrated notably in FIG. 3, the mechanical transmission means 45 also include a connecting member 47, interposed between the downstream end 4612 of said at least one longitudinal arm 461 and the upstream end 322 of the jib 32.

This connecting member 47 extends the jib 32 on the side of its upstream end 322.

And the downstream end 4612 of said at least one longitudinal arm 461 cooperates with this connecting member 47 through knuckle means 475 (pivot).

Herein, this connecting member 47 is composed of two parts:

- an extension section 325, extending the jib 32 beyond the downstream knuckle means 36 and on the side of the upper front wall 315 of the main boom 31, and
- an intermediate arm 471, here forming a connecting rod, assembled with the downstream end 4612 of said at least one longitudinal arm 461 and the extension section 325 through knuckle connection means 472 (pivot).

In other words, the mechanical transmission means 45 comprise a connecting rod-crank assembly, with the intermediate arm 471 forming a connecting rod and the extension section 325 forming a crank.

Moreover, said at least one first linear actuator 42 (also called "luffing cylinder") is arranged between the crane house 2 and the main boom 31.

Said at least one first linear actuator 42 here extends opposite the lower front wall 314 of the main boom 31.

Herein, said at least one first linear actuator 42 advantageously has two ends:

- the upstream end 421 assembled directly with the crane house 2, and
- the downstream end 422 assembled with the main boom 31, at the lower front wall 314 thereof.

Generally, said at least one first linear actuator 42 and said at least one second linear actuator 43 are implanted on either side of the main boom 31, for example opposite the lower front wall 314 and the upper front wall 315 thereof, respectively.

Generally, as illustrated in particular in FIG. 1, the knuckle boom crane 1 can also include a winch drum 8 associated with rotary drive means (not shown, for example at least one motor, advantageously electric or hydraulic) and intended to receive an elongated lifting member 81 (advantageously a cable, for example a metal cable or a synthetic cable).

The winch drum 8 is here carried by the jib 32, at its upper face 325 and on the side of its upstream end 322.

The knuckle boom 3 is advantageously equipped with pulleys 82, here distributed along the jib 32, which are sized, distributed and arranged in such a way as to guide the elongated lifting member 81 between the winch drum 8 and the load to be lifted (not shown).

According to an advantageous embodiment, the active compensation module 51 is designed to also pilot the winch drum 8 (in particular, the rotary drive means thereof), taking into account data coming from the motion reference unit 7, in such a way as to pilot the winding (and unwinding) motion of the winch drum 8.

In this embodiment, the winch drum 8 can be used to smooth the vertical compensation, in order to hold the vertical position of the free end of the elongated lifting member 81.

This approach has for advantage that is allows a vertical second order correction (in height), in combination with the motions of the knuckle boom 3.

Still in this embodiment, the stabilization of the downstream end 323 of the jib 32 (by a piloting of the operating means 4) is coordinated with the winding motion of the winch drum 8.

According to this embodiment, the active compensation module 51 comprises in particular:

- the processing means 512, for determining control instructions for the operating means 4, adapted to stabilize the downstream end 323 of the jib 32, and as the case may be, for determining control instructions for the winch drum 8 (in particular the rotary drive means thereof), adapted to smooth the vertical compensation, and
- piloting means 513, for piloting the operating means 4 and, advantageously, the winch drum 8 (in particular, the rotary operating means thereof), taking into account the control instructions.

The active compensation module 51 thus advantageously forms a computer-controlled system that makes it possible to hold the downstream end 323 of the jib 32 using the operating means 4, or even also to hold the free end (intended to cooperate with a load) of the elongated lifting member 81 in a determined vertical position.

The processing means 512 advantageously include a mathematical model or algorithm, which determines the control instructions for the operating means 4, adapted to stabilize the downstream end 323 of the jib 32 (see also the control instructions for the winch drum 8, in particular the rotary drive means thereof, adapted to stabilize vertically the free end of the elongated lifting member 81 in a determined vertical position) as a function of the data coming from the motion reference unit 7.

Figure 4:
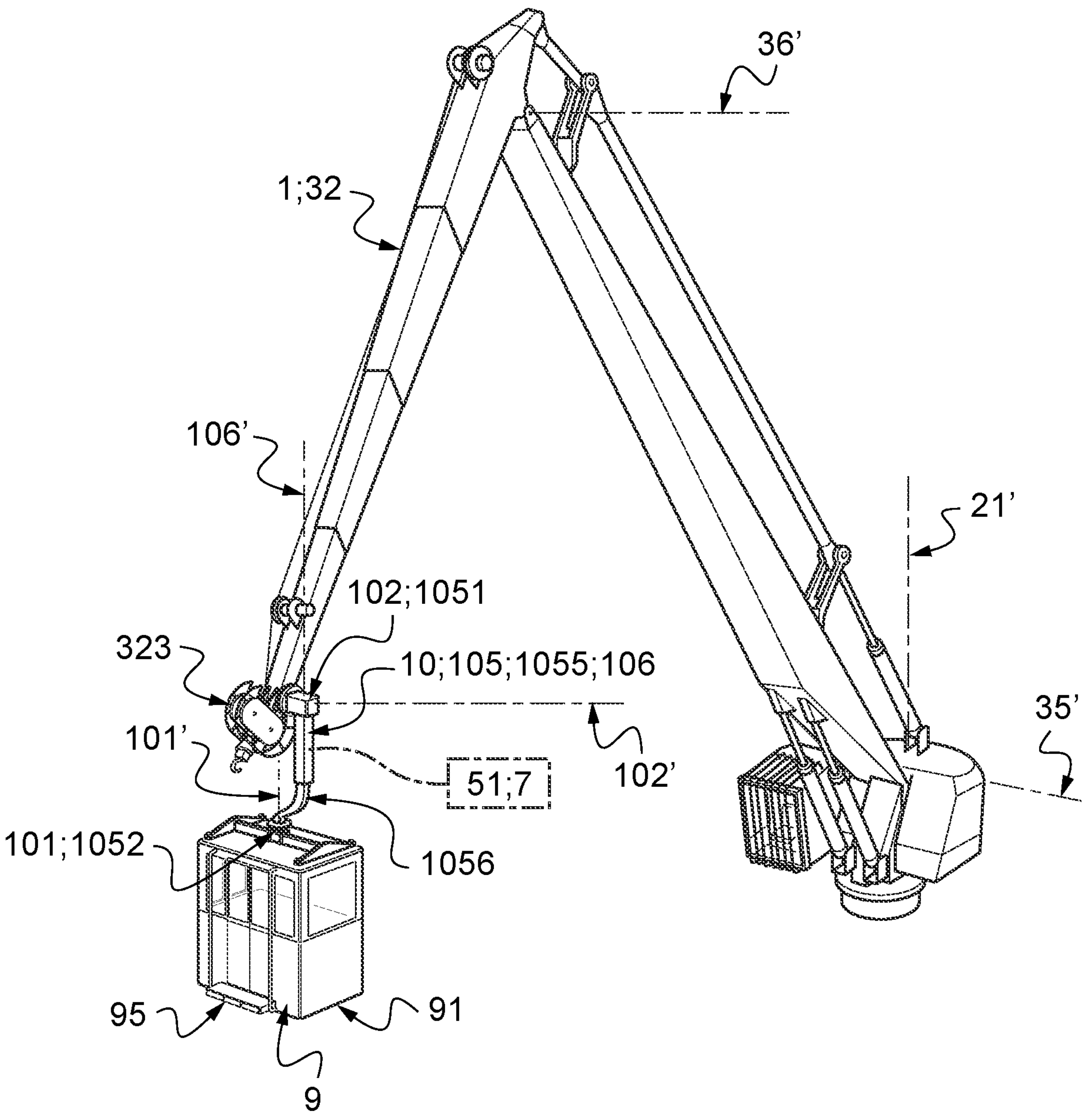
FIG. 4 is an overall and perspective view of a knuckle boom crane according to the invention, equipped with a platform (in the form of a cab) that is secured to the downstream end of the jib through particular connection means.
Figure 5:
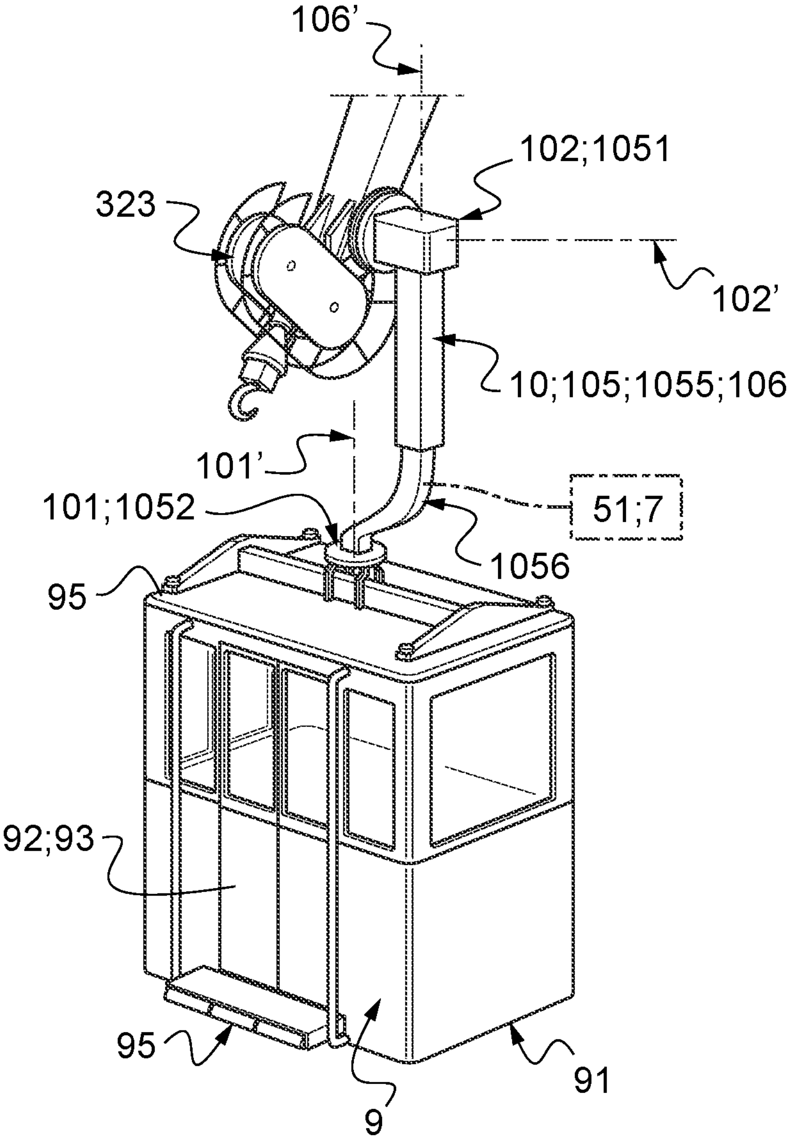
FIG. 5 is a partial and enlarged view of the knuckle boom crane according to FIG. 4, showing the platform and the connection means in more detail.

According to an advantageous technical feature illustrated in FIGS. 4 and 5, the knuckle boom crane 1 also advantageously includes a platform 9 that is secured to the downstream end 323 of the jib 32 through connection means 10.

By "platform", it is advantageously meant a structure intended to receive individuals (generally a cab) or loads, for transferring them.

The platform 9 is advantageously hung to the knuckle boom 3 through connection means 10.

Generally, the connection means 10 ensure an active stabilization of the platform 9 during movements of the knuckle boom 3.

This active stabilization advantageously intervenes at least about a pitch rotation axis (advantageously horizontal) and a yaw rotation axis (advantageously vertical).

In other words, the platform 9 advantageously defines a receiving plane 91 that is advantageously intended to be horizontally stabilized, advantageously in yaw and pitch.

In particular, the platform 9 thus cooperates with the knuckle boom 3, in such a way that:

- the downstream end 323 of the jib 32 is stabilized in space, advantageously about the three axes, and
- the platform 9 is stabilized (preferably in yaw and pitch) with respect to the movement of the downstream end 323 of the jib 32.

For that purpose, the connection means 10 include a combination of at least two actuators 101, 102:

- at least one first slewing actuator 101, intended to generate a slewing motion of the platform 9 with respect to the downstream end 323, according to a yaw rotation axis 101' that is parallel to the slewing axis 21' of the knuckle boom 3, and
- at least one second slewing actuator 102, intended to generate a slewing motion of the platform 9 with respect to the downstream end 323, about a pitch rotation axis 102' that is parallel to the upstream knuckle axis 35' and the downstream knuckle axis 36'.

The yaw rotation axis 101' and the pitch rotation axis 102' advantageously extend in a same plane; the yaw rotation axis 101' and the pitch rotation axis 102' preferably cross each other at 90°.

In other words, said at least two actuators 101, 102 comprise:

said at least one first slewing actuator 101, intended to generate a slewing motion of the platform 9 about the yaw rotation axis 101' that is perpendicular to the receiving plane 91, and said at least one second slewing actuator 102, intended to generate a slewing motion of the platform 9 about the pitch rotation angle 102' that is parallel to the receiving plane 91.

The actuators 101, 102 advantageously consist of rotary actuators, for example motors, preferably electric motors.

In this embodiment, the active compensation module 51 is advantageously designed to also pilot the actuators 101, 102 fitted on the connection means 10, taking into account data coming from a motion reference unit (advantageously fitted on the platform 9), in such a way as to actively stabilize the platform 9, advantageously in yaw and pitch.

The active compensation module 51 is hence designed to pilot the actuators 101, 102 of the connection means 10, in such a way as to prevent the sways generated by the movements of the knuckle boom 3, and in particular of the downstream end 323 of the jib 32.

The active compensation module 51 thus offers an active stabilization of the platform 9 with respect to the movements of the downstream end 323 of the jib 32.

Within this framework, according to a preferred embodiment, the active compensation module 51 comprises:

the processing means 512, for also determining control instructions for the actuators 101, 102 of the connection means 10, adapted to actively stabilize the platform 9, and the piloting means 513, for piloting the actuators 101, 102 of the connection means 10 taking into account said control instructions.

The active compensation module 51 thus advantageously forms a computer-controlled system that allows stabilizing the platform 9 (preventing or compensating for the sways caused by the movement of the knuckle boom 3), using the actuators 101, 102 of the connection means 10.

Thus, in practice, the actuators 101, 102 of the connection means 10 are piloted by the active compensation module 51 according to the invention in such a way as to stabilize the platform 9, taking into account the information coming from the dedicated motion reference unit.

According to a preferred embodiment, the connection means 10 include a link member 105 integrating the above-mentioned actuators 101, 102.

This link member 105, for example in the form of a arm, has two ends:

a first, upper end 1051, secured to the downstream end 323 of the jib 32, and a second, lower end 1052, secured to the platform 9.

The assembly of the first end 1051 with the downstream end 323 of the jib 32, on the one hand, and of the second end 1052 with the platform 9, is for example made through a bearing, for example a plain bearing or a rolling bearing, fitted with the actuators 101, 102.

Preferably, the actuators 101, 102 are distributed at the ends 1051, 1052 of the link member 105:

the first, upper end 1051 includes said at least one second, pitch, slewing actuator 102, and the second, lower end 1052 includes said at least one first, yaw, slewing actuator 101.

Herein, the link member 105 is advantageously laterally secured to the downstream end 323 of the jib 32.

In this case, the link member 105 preferably includes two sections:

an upper section 1055, rectilinear and parallel to the yaw rotation axis 101', intended to extend advantageously vertically, in such a way that the pitch rotation axis 102' passes through the downstream end 323 of the jib 32, a lower section 1056, curved (or bent), in such a way that the yaw rotation axis 101' passes through this same downstream end 323 of the jib 32.

In other words, the point of intersection between the yaw rotation axis 101' and the pitch rotation axis 102' is advantageously located at the downstream end 323 of the jib 32.

This embodiment has for interest to hold the position of the yaw rotation axis 101' and the pitch rotation axis 102' at the downstream end 323 of the jib 32.

According to another distinctive feature, the connection means 10 include damper means 106, advantageously passive, providing a translational degree of freedom of the platform 9 with respect to the downstream end 323 of the jib 32.

In other words, the damper means 106 allow a gap clearance between the ends 1051, 1052 of the link member 105.

The damper means 106 thus define a translation axis 106' that is parallel to the yaw rotation axis 101'.

The damper means 106 are advantageously placed between the upper section 1055 and the lower section 1056.

The damper means 106 consist for example of a spring and a visco-hydraulic suspension, to prevent jerky movements of the platform 9.

According to the embodiment illustrated, the platform 9 consists for example of a cab adapted to receive at least one individual.

The receiving plant 91 advantageously corresponds to the floor of this cab.

The floor is advantageously:

surrounded by lateral walls 92 including at least one access door 93, and topped with a ceiling 95 that is advantageously topped with the connection means 10.

The platform 9 advantageously includes at least one passive, shock absorber 95 (for example, elastomeric blocks), adapted to damp the contacts with the environment.

Figure 6:
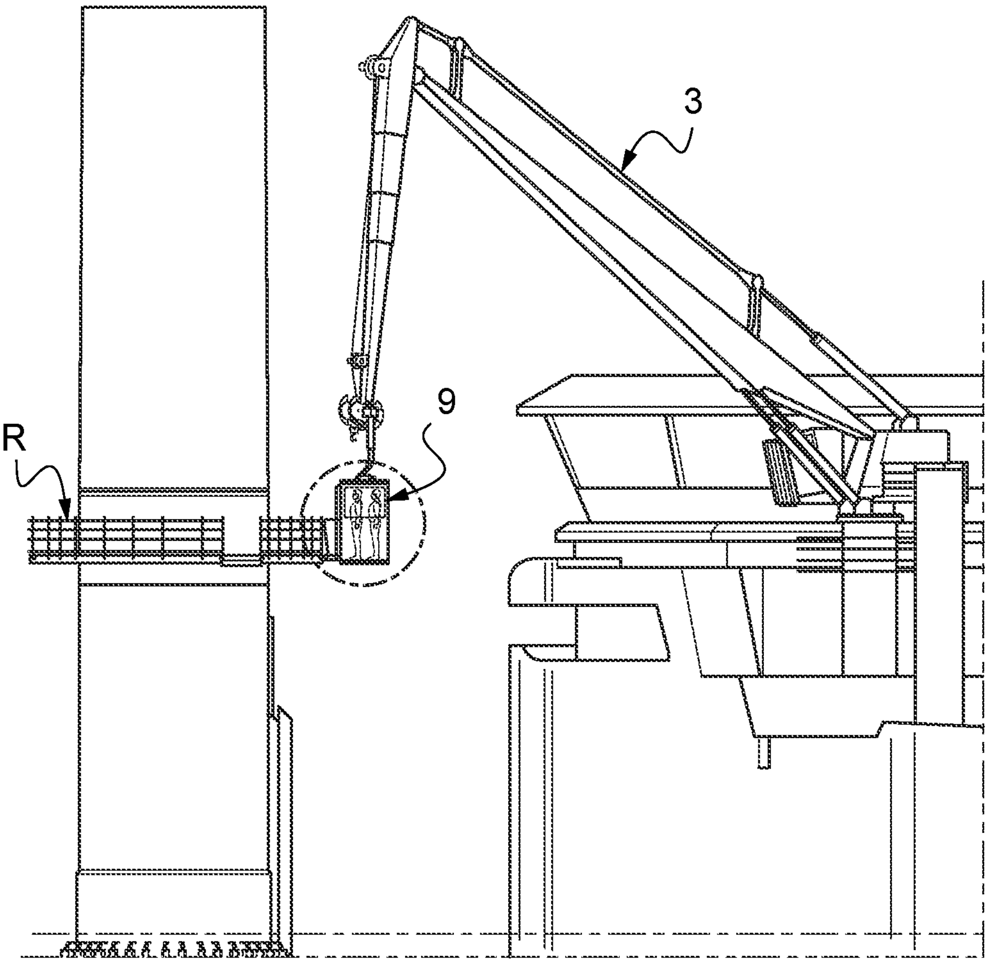
FIG. 6 is an overall view of the knuckle boom crane according to the invention, equipped with the platform (in the form of a cab), during its positioning opposite a receiving surface.

The shock absorber 95 is for example adapted to cooperate with a receiving surface R consisting of a platform carried by the mast of a wind turbine, as illustrated in FIG. 6.

Herein, said at least one shock-absorber 95 is advantageously implanted at the receiving plane 91, for example on at least one side and/or under the latter (for example, at an access door 93).

Generally, the platform 9 is advantageously equipped with manual piloting means (not shown), for manually piloting the actuators 101, 102 of the connection means 10.

Still generally, the downstream end 323 of the jib 32 and the connection means 10 cooperate with each other through removable connection means, integrating electrical and mechanical connection means (in particular for the power supply of the actuators 101, 102 of the connection means 10).

The removable connection means are advantageously provided between the downstream end 323 of the jib 32 and the first (upper) end 1051 of the link member 105.

The link member 105 is hence carried by the platform 9, after separation from the downstream end 323 of the jib 32.

These removable connection means are useful to rapidly fit the downstream end 323 of the jib 32 with the platform 9, or to rapidly deposit this platform 9, as a function of the needs and operations.

Generally, the platform 9, with its connection means 10, could possibly be adapted to a knuckle boom crane other than that of the invention.

Of course, various other changes can be made to the invention within the framework of the appended claims.

The invention claimed is:

1. A knuckle boom crane for offshore application, the knuckle boom crane comprising:

a crane house;

a knuckle boom carried by said crane house, the knuckle boom comprising a main boom and a jib, in series, the main boom and the jib each including an upstream end and a downstream end;

an operating system configured to operate said crane house and said knuckle boom; and a controller including a computer, the controller being configured to pilot said operating system by active compensation by taking into account data coming from a motion reference system, to stabilize the downstream end of the jib, wherein said crane house comprises a slewing knuckle configured to define a slewing motion of the knuckle boom about a slewing axis, said crane house and said upstream end of the main boom cooperate through an upstream knuckle to define a luffing motion of said main boom about an upstream knuckle axis, said downstream end of the main boom and said upstream end of the jib cooperate through a downstream knuckle to define a folding motion of said jib about a downstream knuckle axis, said operating system comprises:

at least one slewing actuator configured to generate the slewing motion of said knuckle boom, at least one first linear actuator configured to generate said luffing motion of said main boom, and at least one second linear actuator configured to generate said folding motion of said jib, said at least one second linear actuator being connected to said crane house and said jib, said at least one second linear actuator being connected to said jib through a mechanical transmission system, said at least one second linear actuator having an upstream end assembled directly with the crane house and a downstream end assembled with the jib through the mechanical transmission system.

2. The knuckle boom crane, according to claim 1, wherein the mechanical transmission system comprises a deformable parallelogram structure comprising:

at least one longitudinal arm interposed between said at least one second linear actuator and said jib, and at least two swing arms, each of the at least two swing arms being interposed between said longitudinal arm and the main boom.

3. The knuckle boom crane, according to claim 2, wherein the mechanical transmission system further comprises a connecting member interposed between a downstream end of said at least one longitudinal arm and the upstream end of the jib, said connecting member extending said jib on the side of the upstream end of the jib, said downstream end of said at least one longitudinal arm cooperating with said connecting member through another knuckle.

4. The knuckle boom crane of claim 2, wherein the at least one longitudinal arm extends opposite and along the main boom.

5. The knuckle boom crane of claim 2, wherein the at least one longitudinal arm extends opposite and along the main boom.

6. The knuckle boom crane, according to claim 1, wherein said at least one first linear actuator is disposed between the crane house and the main boom.

7. The knuckle boom crane, according to claim 6, wherein said at least one second linear actuator is connected to said crane house and to said jib, and wherein said at least one first linear actuator and said at least one second linear actuator are disposed on either side of the main boom.

8. The knuckle boom crane, according to claim 1, further comprising a winch drum associated with a rotary drive comprising at least one motor and configured to receive an elongated lifting member.

9. The knuckle boom crane of claim 8, wherein said controller is configured to pilot said winch drum, taking into account data coming from said motion reference system to pilot the winding motion of said winch drum.

10. The knuckle boom crane, according to claim 1, wherein one or more of said at least one first linear actuator and said at least one second linear actuator consist of a hydraulic cylinder or an electric cylinder.

11. The knuckle boom crane, according to claim 1, wherein the controller is configured to collect data coming from the motion reference system, determine control instructions for the operating system, and stabilize the downstream end of the jib, or also determine control instructions for the winch drum, and pilot said operating system, or also said winch drum, taking into account said control instructions.

12. The knuckle boom crane, according to claim 1, further comprising the motion reference system.

13. The knuckle boom crane, according to claim 1, further comprising a platform that is secured to the downstream end of the jib through a connector including a combination of at least two connector actuators including:

at least one first slewing connector actuator configured to generate a slewing motion of said platform with respect to said downstream end, about a yaw rotation axis that is parallel to said slewing axis of the knuckle boom, and at least one second slewing connector actuator to generate a slewing motion of said platform with respect to said downstream end, about a pitch rotation axis that is parallel to the upstream knuckle axis and the downstream knuckle axis, said controller being configured to pilot said at least two connector actuators of said connector, taking into account data coming from the motion reference system to actively stabilize said platform.

14. A craft for offshore application, equipped with the knuckle boom crane according to claim 1.

15. The knuckle boom crane of claim 1, wherein the controller is configured to pilot the operating system to stabilize the downstream end of the jib in at least one of a horizontal plane and a vertical position.

16. The knuckle boom crane of claim 1, wherein the controller is configured to pilot the operating system to stabilize the downstream end of the jib in all directions.

* * * * *